United States Patent [19]

Perrot

[11] Patent Number: 4,592,693
[45] Date of Patent: Jun. 3, 1986

[54] CARRYING PLATFORM FOR RECEIVING A GOODS VAN OR CONTAINER AND PROVIDED WITH MEANS FOR ITS ADAPTATION TO TRANSPORT BY ROAD, RAIL AND SEA

[76] Inventor: Pierre G. J. Perrot, 14 Rue de l'Abreuvoir, 27320 Nonancourt, France

[21] Appl. No.: 564,509

[22] Filed: Dec. 22, 1983

[30] Foreign Application Priority Data

Dec. 22, 1982 [FR] France .................... 82 21540

[51] Int. Cl.⁴ .............................................. B60P 1/00
[52] U.S. Cl. ........................ 414/495; 114/270; 180/9.3; 280/43.23; 410/56; 414/498
[58] Field of Search ............... 414/495, 498; 280/43.23, 43.24, 704, 766.1; 180/209, 9.26, 9.3; 105/215 C; 410/56, 57; 114/48, 258, 259, 260, 270

[56] References Cited

U.S. PATENT DOCUMENTS

| | | | |
|---|---|---|---|
| 2,703,659 | 3/1955 | Hutchins | 414/498 |
| 3,737,061 | 6/1973 | Glumac | 414/498 X |
| 3,884,494 | 5/1975 | Ashby et al. | 414/495 X |
| 4,050,707 | 9/1977 | Glumac | 280/43.23 |
| 4,265,588 | 5/1981 | Oshel et al. | 410/56 X |
| 4,316,418 | 2/1982 | Hindin et al. | 105/215 C |

FOREIGN PATENT DOCUMENTS

| | | | |
|---|---|---|---|
| 644880 | 7/1962 | Canada | 105/215 C |
| 936216 | 12/1955 | Fed. Rep. of Germany | 105/215 C |
| 1368963 | 6/1964 | France | |
| 2395852 | 1/1979 | France | |

Primary Examiner—Robert J. Spar
Assistant Examiner—Stuart J. Millman
Attorney, Agent, or Firm—Cushman, Darby & Cushman

[57] ABSTRACT

The carrying platform includes means for adapting it to railway bogies, a tracked road bogie or a support structure in a boat for transporting the van by railway, road or sea. The platform comprises a frame having two parallel side-members 100 each of which has an inverted U-shaped cross-section, the branches 101 of which are extended, except adjacent the ends of the side-members, by lateral wings 102 so that each side-member has in the part thereof provided with the wings an omega type of cross-section. Cross-members 600 interconnect the side-members 100 in the regions thereof provided with the wings 102. The end parts of the side-members 100 outside the wings 102 are assembled by plate structures 400 for bearing on a support such as a railway bogie 39. Rolling devices 151 having free rollers 152 are connected to the ends of the side-members 100. A retractable set of road wheels 17, 18, 19 is connected to the platform and hydraulic prop structures 32, 150 are provided and have sufficient travel to raise the carrying platform 37 so that the rolling devices 151 can bear against railway bogies 39, tracked road bogies 9 or a support structure 72, 74, 75 in a boat.

10 Claims, 28 Drawing Figures

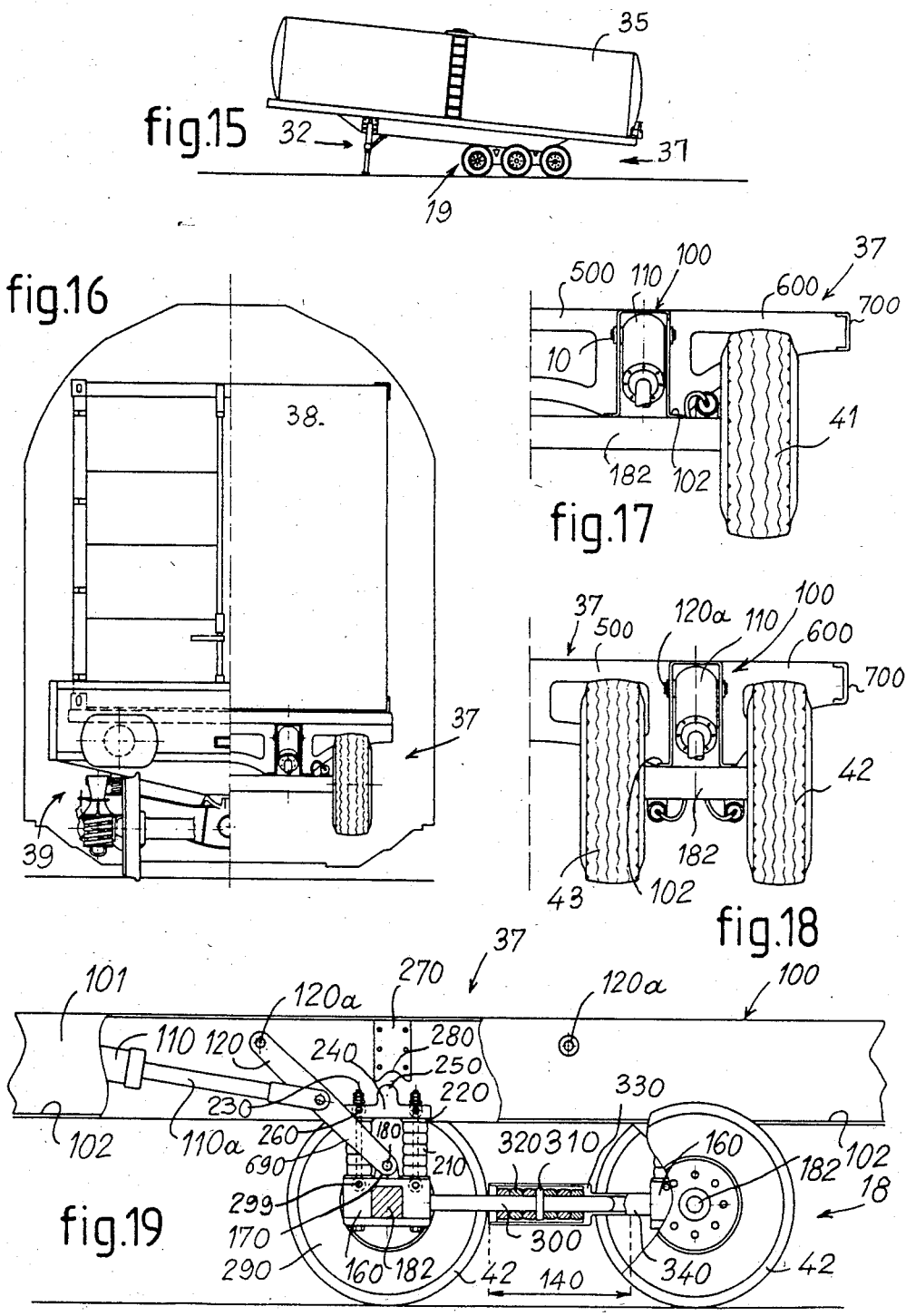

CARRYING PLATFORM FOR RECEIVING A GOODS VAN OR CONTAINER AND PROVIDED WITH MEANS FOR ITS ADAPTATION TO TRANSPORT BY ROAD, RAIL AND SEA

The present invention relates to a carrying platform for receiving a goods van or container and comprising self-adaptation means with respect to railway bogies, tracked bogies or a support structure in a boat for the transport of the van by railway, road or sea.

This carrying platform may also be coupled to a road or tracked tractor. As is known, the transport of goods in containers or vans still presents many problems, principally due to breaks in the load, whereas there usually exist at the places of dispatch or delivery specific means and devices for handling the products transported.

Consequently, an object of the invention is to eliminate all breaks in the load liable to occur between the place of dispatch and the place of delivery, regardless of the manner of conveying the goods contained in the van, ie. by road, rail or sea or by cross-country vehicles such as tracked tractors.

A semi-trailer is known which is provided with a road set of wheels combined with a raising device whereby it is possible to place the rear of the semi-trailer on a railway bogie, the positioning of the front part of the semi-trailer being effected by means of a conventional prop structure.

This construction has various drawbacks: difficulty of simultaneously conforming to highway circulation rules of different countries and UIC railway standards while retaining a maximum of useful loads; impossibility of the use of containers conforming to ISO standards in railway transport; necessity to present the semi-trailer in accordance with the disposition of the bogies, the front and the rear being different. The positioning on the front bogie is difficult owing to the use of a conventional prop and to the necessity to cause the axes of the road convoy to coincide with the axes of the bogies for the rail-road transfer with precision.

An object of the invention is therefore to render it possible to transport products from the place of dispatch to the place of delivery regardless of their geographical positions without the load leaving the carrying platform, which is consequently arranged to be easily adapted to the conveying mode employed (road, rail, cross-country, sea).

The invention therefore provides a carrying platform which comprises: a frame having two parallel side-members each of which has an inverted U-sectional shape the branches being extended, except at the ends of the side-members, by lateral wings, each side-member thus having in its part provided with the wings an omega type of cross-sectional shape, cross-members interconnecting said side-members along the regions thereof provided with wings while the end parts of said side-members outside said wings are assembled by plates for bearing against a support such as a railway bogie, rolling devices including free rollers connected to the ends of the side-members, a retractable road set of wheels and hydraulic props having sufficient travel for raising the carrying platform, the rolling devices being capable of bearing against either railway bogies, or tracked road bogies, or a support structure in a boat.

It will be understood that it is thus possible to transfer the carrying platform and its load from one means of transport to another, for example from a road tractor to railway bogies placed under the ends of the platform by actuating means provided on the carrying platform itself and on the support in question, for example the railway bogie.

The invention therefore also includes means for the adaptation and the centering of the carrying platform on supports for the latter, and in particular on railway bogies and on a tracked road bogie so that troublesome breaks in the loads encountered with structures of the prior art are avoided.

Further features and advantages of the invention will be apparent from the following description with reference to the accompanying drawings which illustrate several embodiments and several ways of carrying out the invention.

In the drawings:

FIG. 15 is an elevational view of the carrying platform in an inclined position achieved by means of its hydraulic front prop structure, for emptying a tank mounted on its superstructure;

FIG. 16 is, on the left, a half-end elevational view of the assembly of a carrying platform and its container mounted on a support in the form of a railway bogie and, on the right, a half-end elevational view of the carrying platform and its container alone (the latter being in section) with a road wheel in a raised position;

FIG. 17 is a partial end elevational view, showing the position of the wheels for a carrying platform whose road set of wheels is provided with one, two or three axles;

FIG. 18 is an elevational view of the placement of the wheels when the road set of wheels must be provided with semi-axles owing to the total rolling weight;

FIG. 19 is a partial elevational view of the carrying platform, with a part cut away showing a mechanism for suspending, and allowing movement to, a pair of axles (tandem) of road wheels carried by the carrying platform;

Figure 1:
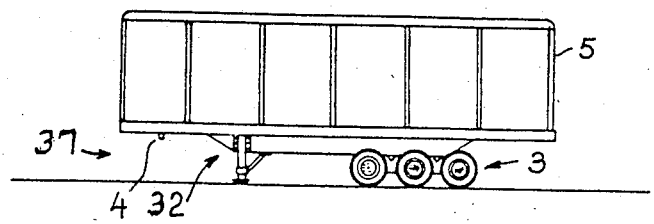
FIG. 1 is a longitudinal elevational view of one embodiment of the carrying platform according to the invention, provided with a road set of wheels having three axles and carrying a goods van, this platform bearing on the road set of wheels and on a front hydraulic prop.

The carrying platform 37 diagrammatically shown in FIG. 1 is provided with two hydraulic prop structures 32 in its front part and a road set of wheels 3 having three axles in its rear part, a king-pin 4 being provided in the vicinity of its front part for coupling it to a tractor, this carrying platform 37 carrying a van 5.

Figure 2:
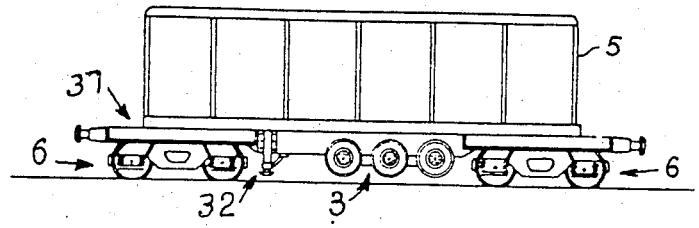
FIG. 2 is a longitudinal elevational view of the carrying platform and of the van shown in FIG. 1, mounted on two railway bogies.
Figure 3:
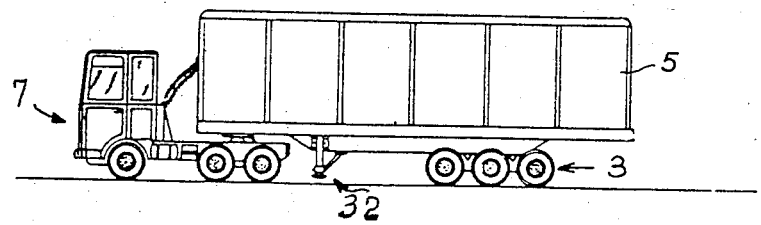
FIG. 3 is a longitudinal elevational view of the carrying platform and its van coupled to a road tractor.
Figure 4:
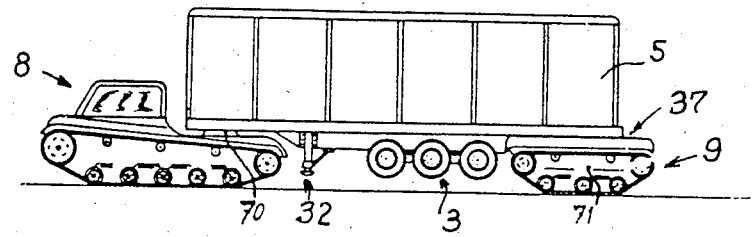
FIG. 4 is a longitudinal elevational view of the carrying platform and its van coupled to a tracked tractor and mounted by its rear part on a tracked road bogie.

In FIG. 2, the carrying platform 37 is mounted on a support in the form of two railway bogies 6, its prop structures 32 and its road set of wheels 3 being retracted. In FIG. 3, the carrying platform 37, which will be termed hereinafter for reasons of convenience "platform", is coupled by its king-pin 4 to support in the form of a road tractor 7, its road set of wheels 3 being lowered and its prop structures 32 being raised. In FIG. 4, the platform and its van 5 are mounted on a first support in the form of a tracked road tractor 8 which receives the king-pin 4 and on a second support in the form of a tracked road bogie 9 receiving the rear part of the platform 37, the prop structures 32 and the set of wheels 3 of which are raised.

Figure 5:
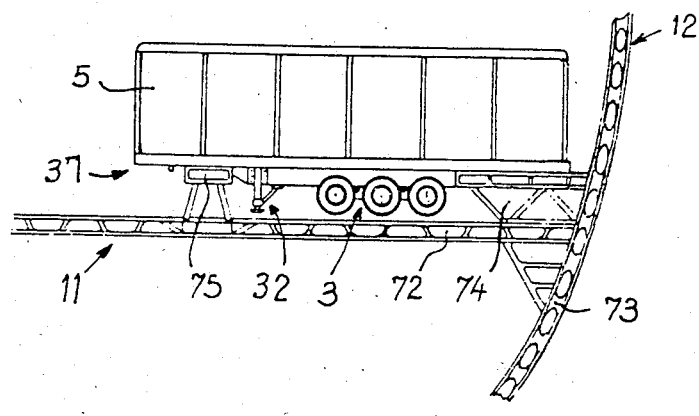
FIG. 5 is a longitudinal elevational view of the carrying platform and its van mounted on a support structure of a boat for transport by sea.
Figure 6:
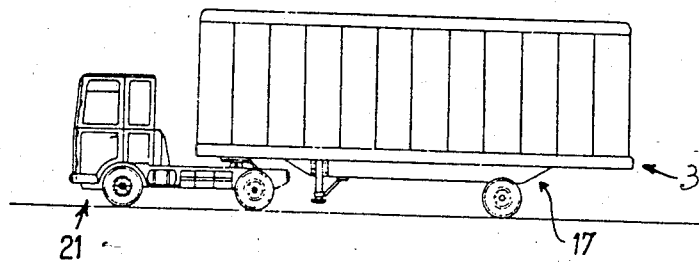
FIGS. 6 to 9 are longitudinal elevational views of several embodiments of the carrying platform according to the invention, coupled to road tractors, the road sets of wheels having various configurations in order to conform to road circulation regulations in accordance with the total travelling weight.
Figure 7:
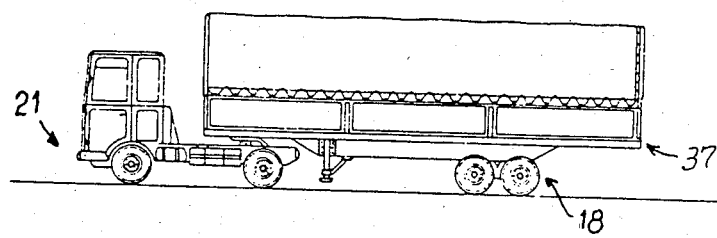
Figure 11:
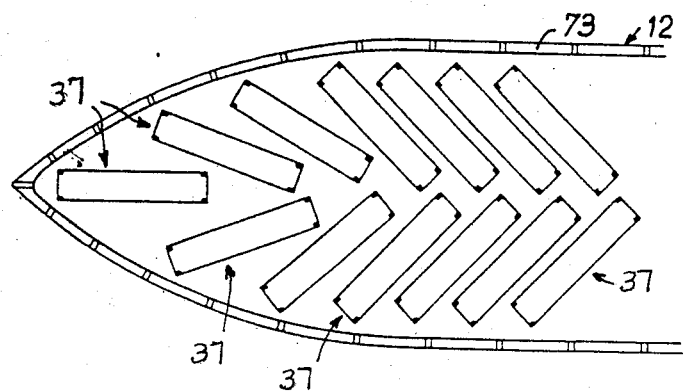
FIG. 11 is a top plan view of a group of carrying platforms fastened to the deck of a boat.

FIG. 5 shows the platform 37 and its van 5 mounted on a support in the form of a structure 11 on a boat 12, with the set of wheels 3 and the prop structures 32 raised. This support structure comprises the deck 72 of the boat, the hull 73 of which can be seen, the assembly being placed in such manner that the rear of the platform 37 can be fastened to fixed peripheral bed-plates 74 and then, after the withdrawal of the road tractor which had brought the platform 37 into position, fastened to a withdrawable trestle 75. The fixed bed-plates 74 and the trestle 75 are installed so as to permit the positioning of a maximum number of carrying platforms 37 in the ship, for example by disposing them in a herring-bone configuration as illustrated in FIG. 11. This disposition facilitates the alternating withdrawal of all the convoys without loss of time.

Figure 8:
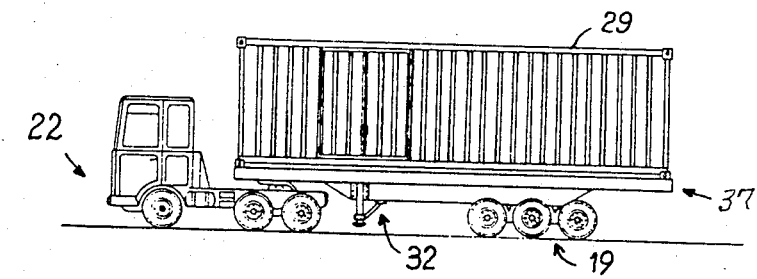
Figure 9:
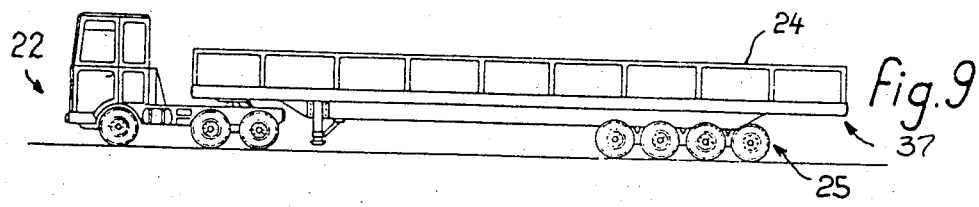

FIGS. 6 to 9 show platforms 37 respectively having one road wheel axle 17, two road wheel axles 18 and three road wheel axles 19 (tridem), coupled to supports in the form of road tractors 21, 22, the tractor 21 having a single rear wheel axle and the tractor 22 two rear wheel axles. FIG. 9 shows a carrying platform 37 on which is disposed a load 24 and which has four semi-axles 25, this platform being coupled to a support in the form of a road tractor 22. These various configurations enable the road circulation regulations to be conformed to in accordance with the total travelling weight.

Figure 10:
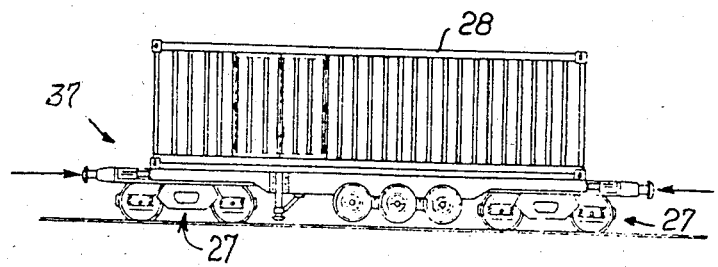
FIG. 10 is a longitudinal elevational view of a carrying platform and its container mounted on two railway bogies.

FIG. 10 shows a platform 37 mounted on a support in the form of railway bogies 27 and on which platform is disposed a container 28, for example having a length of 40 feet according to ISO standards. The platform 37 is between two buffers so as to be capable of withstanding along its axis of resistance the compressive railway forces.

Figure 12:
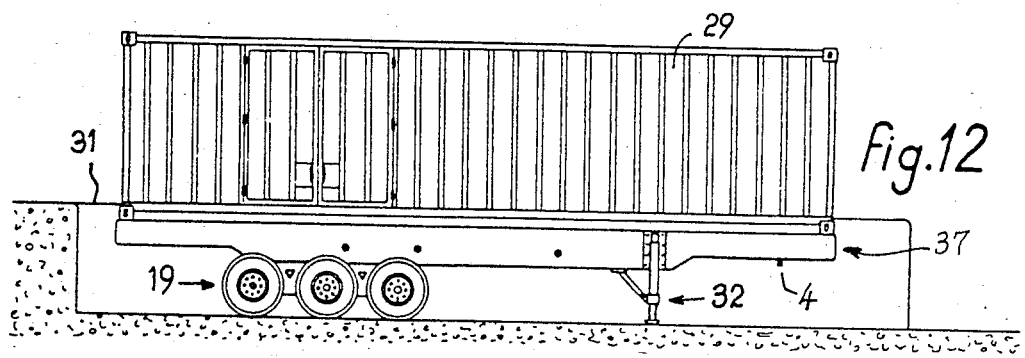
FIGS. 12 to 14 are elevational views illustrating the successive stages in the positioning of a container placed on a carrying platform according to the invention alongside a loading platform, the carrying platform then acting as a vertically movable raising platform for placing its container on the loading platform and thereafter leaving it there.

FIG. 12 shows a "tridem" carrying platform 37, ie. a platform whose road set of wheels 19 has three axles, a container 29 identical to that shown in FIG. 8 being disposed on this platform, ready to be placed on a loading platform 31, the platform 37 bearing against its set of wheels 19 and against two hydraulic prop structures 32.

Figure 13:
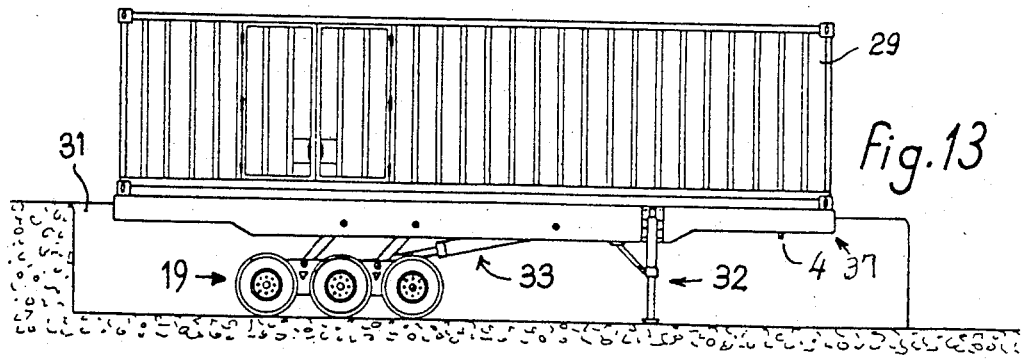

In FIG. 13, the platform 37 has been raised by means of a hydraulic mechanism comprising two lateral hydraulic jacks 33, articulated, on one hand, to the frame of the platform and, on the other hand, to the road set of wheels 19, and by actuation of hydraulic prop structures 32. The container 29 is then unloaded from the platform 37 by means not shown so as to be placed at the loading platform 31, then the platform 37 is lowered by actuation in the opposite direction of the hydraulic devices 32, 33, and coupled by its king-pin 4 to a road tractor 34 (FIG. 14) for driving away after raising the corresponding end of the platform by means of the prop structures 32.

In FIG. 15, the platform 37 carries a tank 35 and bears on its road set of wheels 19 and on its prop structures 32, the latter having been sufficiently extended to incline the platform 37 and the tank 35 rearwardly so as to empty the latter.

FIG. 16 shows a platform 37 carrying a container 38 and mounted on a support in the form of a railway bogie 39, the container 38 being in accordance with ISO standards and being preferably inscribed within the UIC master gauge as the outline of this gauge shows. Two sets of wheels 41 support this platform 37.

FIG. 17 shows the placement of these wheels 41 for a platform 37 whose road set of wheels have one, two or three axles, while FIG. 18 shows the placement of wheels 42, 43 when the road set of wheels must be equipped with semi-axles owing to a high total rolling weight.

There will now be described, with reference to FIGS. 17 to 28, one embodiment of the carrying platform 37 according to the invention in the case where this platform is mounted on a support in the form of railway bogies 39 on which are provided devices for centering the platform and permitting its adaptation to the bogies, the centering devices also being part of the invention.

The platform 37 comprises a main frame formed by two parallel side-members 100, each of which has an inverted U-shaped cross-section with two vertical branches 101 which are extended between opposite end portions 200 of said side-members 100 supported on the bogies 39, by horizontal lateral wings 102 (FIGS. 17, 18, 20 and 21), the vertical branches 101 being connected by a horizontal upper branch 103 so that each side member 100 has a substantially omega cross-sectional shape between its end portions 200. The latter are adapted to be supported on the bogie 39 through a lower plate structure 400 (FIGS. 19, 20, 21, 22 and 23). The frame of the platform 37 also has between the end portions 200 cross-members 500 which interconnect the side-members 100, and brackets 600 on the end portions of which are mounted lateral edge members 700 forming the longitudinally extending edges of the platform 37, and strong end cross-members 800 which bear against the end of the side-members 100 and the lateral edge members 700. The end cross-members 800 are directly subjected to the high forces of compression during the travelling on the railway circuit and are reinforced by the edge of the plate structure 400 on each side of the side-members 100, by gussets 90 (FIG. 21). This frame may be made advantageously from alloy steel, all the component parts of the platform 37 being so dimensioned and positioned as to take into account the choice of the alloy steel so as to be capable of resisting with a minimum of weight the 200 metric tons compression force laid down by railway standards.

Adjacent each front end portion 200 of the platform 37 and at the junction of the wings 102, are fixed two hydraulic prop structures 32 (FIG. 20) which are of known type and have a power and travel suitable for the described utilization. The king-pin is fixed to the lower part of the plate structure 400 in the suitable region for allowing the coupling of the platform 37 to a road tractor of any type.

The platform 37 has rolling devices 151 (FIGS. 20 and 28) having free rollers 152, 190 (FIGS. 20 and 28), which may bear against the support in the form of the bogie 39 in the presently described embodiment but may also bear against supports in the form of tracked road bogies or the trestle 75 placed on the deck 72 of a boat 12 (FIG. 5). Two rolling devices 151 are provided on each end portion 200 of a side-member 100 for enabling the platform 37 to bear on its support. These rolling devices will be described in detail hereinafter.

The invention also provides means for centering the platform 37 on its support 39 so as to place it coaxially with respect to the latter. These means comprise, in the presently-described embodiment, toggle mechanisms 153 mounted on the bogie 39 (FIGS. 22, 23) and provided with shoes 154 equipped with free rollers 155 on their upper side. The shoes 154 are vertically movable so that the rolling plane of the rollers 155 may be substantially raised relative to the horizontal plane P of the bogie 39 (FIGS. 22 and 23) so that the platform 37 can bear against all of the rollers 155 and be centered by a lever system 156 which is capable of shifting the platform 37 on the rollers 155 which are then placed in an upper position.

Figure 24:
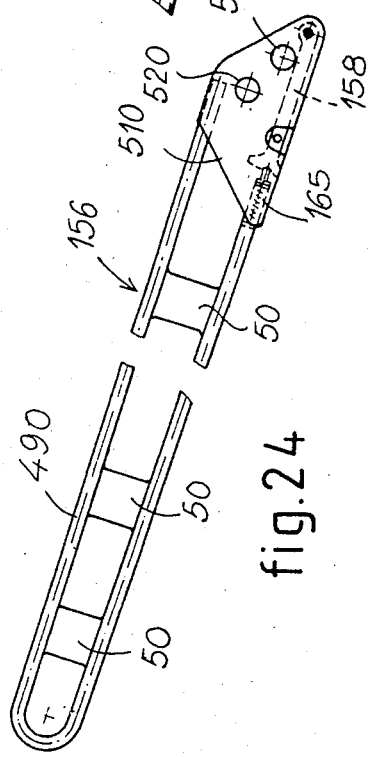
FIG. 24 is a plan view of a lever for centering the carrying platform on its support, in starting at its position illustrated in FIG. 22.

The lever system comprises a manual lever 156 which may be pivotally connected to a pivot 480 (FIG. 25) fixed to a side of the bogie 39 laterally of the platform 37, and a link 158 which is pivotally mounted at 159 on one end of the lever 156 in the vicinity of the pivot 157. The link 158 has an end portion in which is formed a recess 161 bordered by two finger members 162, 163, the finger member 163 being capable of engagement in an opening 164 arranged on one side of the platform 37, while the finger member 162 bears against the platform 37 outside the opening 164. The lever 156 has a latch 165 provided with a pin 166 biased by a spring, this pin being capable of engaging in the recess 161 when the link 158 is swung inside the head of the lever 56 which is recessed for this purpose so as to retain in position the link 158 (FIG. 24). Under these conditions, the platform 37 can be shifted on the rollers 155 of the shoes 154 when the mechanisms 153 are in the upper positions (FIG. 22) by actuation of the lever 156. The latter can indeed exert on the platform 37 a thrust through the link 158, for example from the position shown in FIG. 22, in which the platform 37 is laterally spaced from a stop buffer 167 fixed to the bogie 39, to the position shown in FIG. 23 in which the platform 37 has been brought to a position of abutment against the stop buffer 167 after having been shifted by means of the lever 156.

The bogie 39 is moreover provided with pivotal hooks 168 for locking the platform 37 and capable of being shifted by articulated links 169, 171 (FIGS. 20, 21, 26 and 27). The links 171 are pivotally mounted by horizontal shafts 172 and these devices can be actuated by hydraulic means (not shown) so as to shift the hooks 168 from their lower position (FIG. 26) to their locking position (FIG. 27) in which they are placed over members 173 fixed to the cross-members of the platform 37 laterally of the side-members 100. The placing of the hooks 168 over the members 173 however allows the platform 37 to slide in axial translation, as will be explained in detail hereinafter.

Figure 20:
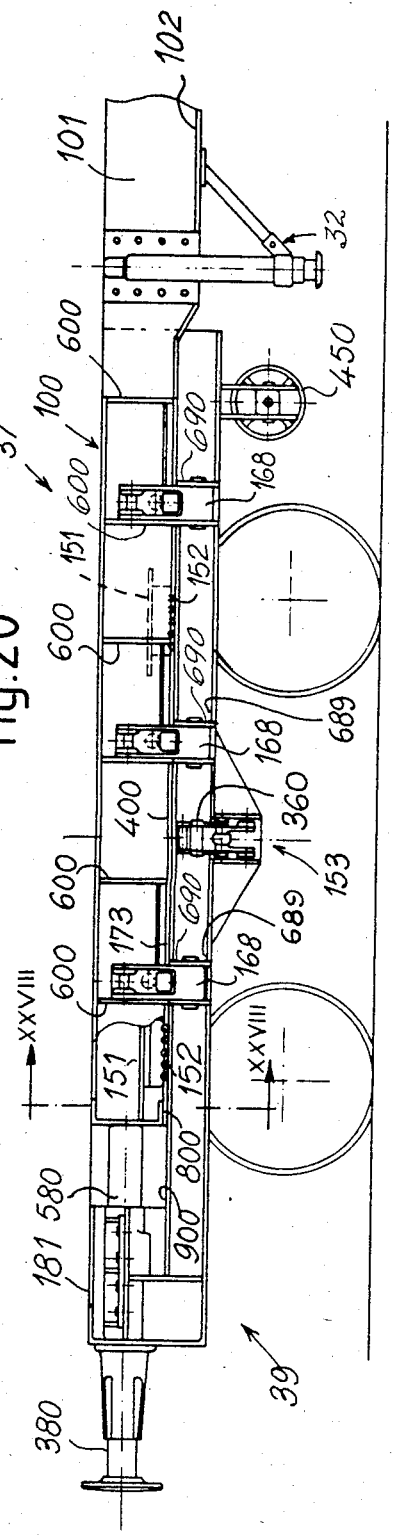
FIG. 20 is a side elevational view of an end part of the carrying platform mounted on a railway bogie.
Figure 21:
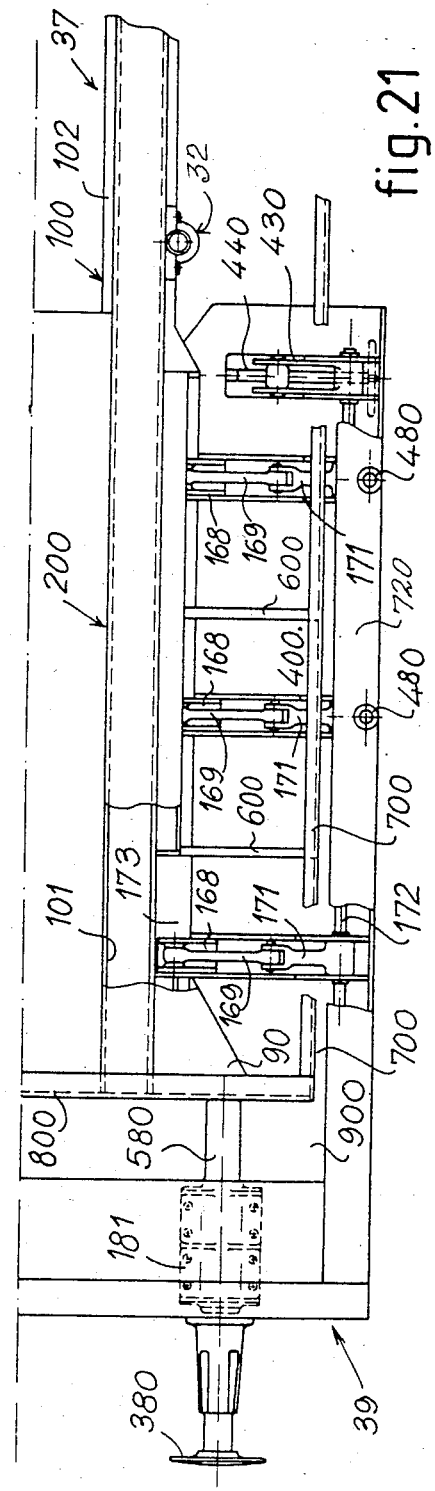
FIG. 21 is a partial top plan view of one half of the carrying platform and the bogie shown in FIG. 20.
Figure 23:
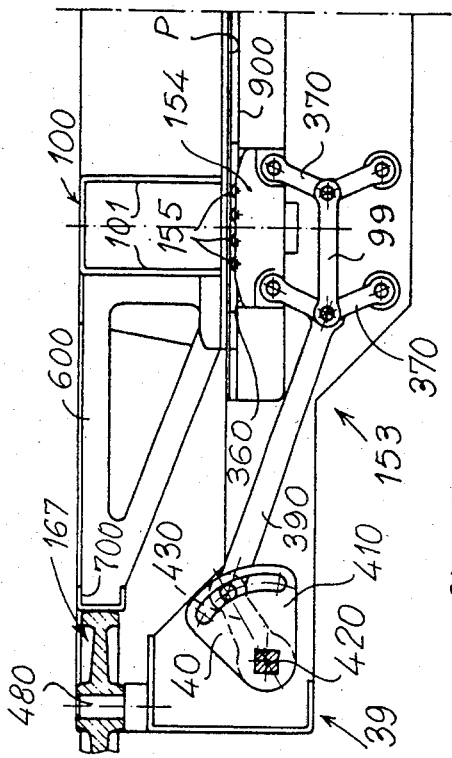
FIG. 23 is a view similar to FIG. 22 but showing the toggle centering device in its lower position, the carrying platform being centered and bearing against the bogie.
Figure 22:
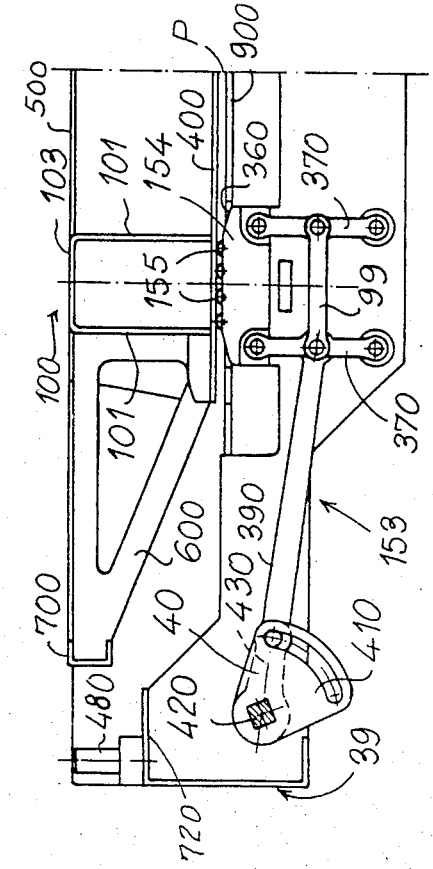
FIG. 22 is an end elevational view showing a toggle device having a shoe provided with free rollers for permitting the centering of the carrying platform on the bogie, the shoe being in its upper position for supporting the platform.
Figure 25:
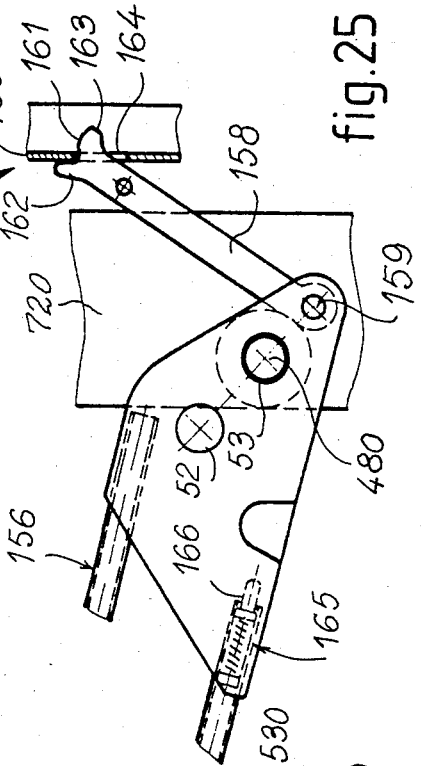
FIG. 25 is a partial plan view of the lever shown in FIG. 24 and a link pivotally connected to this lever, this link being engaged in a lateral opening in the carrying platform for centering it relative to the support.
Figure 28:
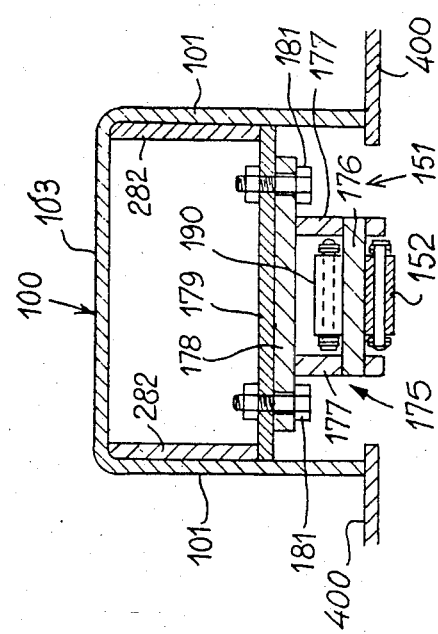
FIG. 28 is a cross-sectional view of a side-member of the platform taken along line XXVIII—XXVIII of FIG. 20, showing a rolling device having free rollers.

With reference now to FIGS. 20 and 28, it can be seen that each of the rolling devices 151 is disposed on one end portion 200 of and inside a side-member 100 and comprises a "track" device 175 having recirculating free rollers 152, 190. The track device 175 is of known type and constituted mainly by a plate 176 surrounded by upper rollers 190 and lower rollers 152 which are maintained in position by two lateral walls 177 fixed to a base 178 which is secured to a plate 179 fixed to the walls 101 to be perpendicular to the latter, for example by welding. Bolts 181 extend through the base 178 and the plate 179 and fix the track device 175 to the latter and supporting spacer blocks 282 fixed to the branches 101 of the side member 100 are interposed between the plate 179 and the horizontal branch 103 of the side member.

The track device 175 and the blocks 282 are so dimensioned that the lower rollers 152 are positioned in the vertical direction so that they project slightly below the horizontal plane defined by the lower face of the plate 400 (FIG. 28). Consequently, when the platform 37 is disposed on two bogies 39 with one bogie under each end portion 200, it bears against the latter through the rollers 152 and can be shifted back under the effect of an impact transmitted by the buffers 380 and shock-absorbers 181 (FIGS. 20, 21), also owing to the possibility of the platform 37 to slide in translation notwithstanding the closure of the hooks 168 onto the members 173.

The intermediate portion between the end portions 200 of the platform 37 is provided with axles 182 (FIGS. 17–19) each provided with a suspension having in its upper part a yoke 240 which defines a boss 250 adapted to be inserted in a corresponding cup 280 formed in a support member 270 fixed internally to the associated side wall 101 of the side-member 100, the road set of wheels comprising the axles 182 being then in the retracted position. The axles 182 may be placed either in this upper retracted position or in a lower position (FIG. 19) by a hydraulic jack 110 whose rod 110a is pivotally connected to a link 120 which is pivotally connected, on one hand, to the side-member 100 and, on the other hand, to a pin 180 of a lower yoke 290 connected to a housing 160 in which the axle 182 is mounted. The hydraulic jack 110, its rod 110a and the link 120 are disposed internally of the side-member 100 (FIGS. 17, 18, 19) and between its end portions 200 and is capable of actuating the road set of wheels 18 having two axles 182 in this example. The suspension of each axle 182 is formed by stacks of rings 210 made from an elastically yieldable material such as an elastomer and interposed between the upper yoke 240 and the lower yoke 290. The links 120 are pivotally connected to pins 120a which extend through the side-members 100 and ensure the vertical displacements of the axles 182 and their wheels 42, 43, the movements of which are synchronized by connection arms 140. The jacks 110 and the jacks of the prop structures 32 are supplied with hydraulic power by a hydropneumatic pump which is known per se but has the advantage of employing as source of power compressed air which is to be found on road tractors and railway convoys.

However, in the case where there exists, fixed to the platform 37, a motorized transfer pump, the motor of said pump, owing to a double clutch, will be used both for the transfer of the goods and for the operations of adapting the carrying platform to the chosen mode of transport.

Downstream of either of the pumps supplying the hydraulic power, there is provided a gate valve having combinations which permit the isolated operation of the jacks 110, or the isolated operation of the prop structures 32, or the synchronized operation of the jacks 110 and the prop structures 32.

Figure 14:
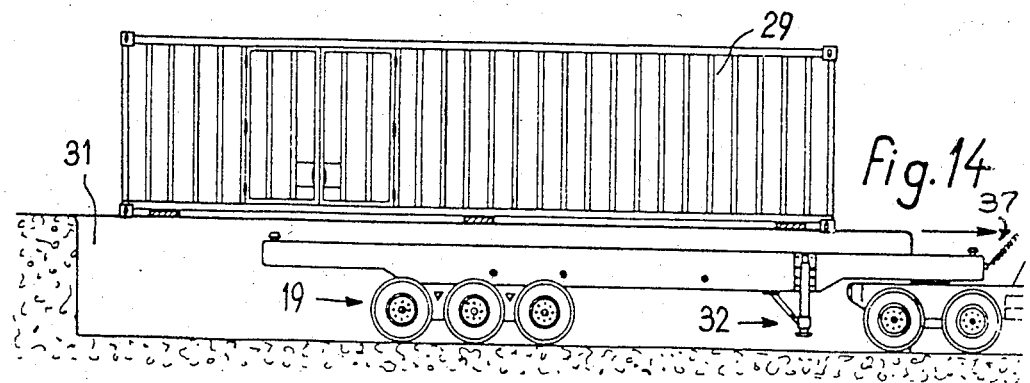

This permits placing alternatively the ends of the platform on front or rear bogies or inclining the platform so as to ensure or complete the emptying of a tank (FIG. 15) and, in associating the movements of the two jacks 110 plus the prop structures 32, converting the platform into a raising platform so as to permit the passage onto the two bogies without inclining the load. It is also possible, which constitutes a considerable advantage of the invention, to take from loading platforms or to deposit on the loading platforms or under a gantry, containers, mobile cases or unitary loads (FIGS. 12, 13 and 14).

The complete axle (FIG. 19) is arranged in such manner as to constitute an independent element but is capable of being associated with others so as to permit easily modifying the road set of wheels for the purpose of conforming to the regulations of road circulation according to the total rolling weight. This adaptation can be clearly seen in FIG. 6: one axle, FIG. 7: two axles, FIG. 8: three axles or tridem, FIG. 9: four semi-axles.

Fixed on each side of the yoke 290 (FIG. 19) carrying the axle 182 are screwthreaded rods 690 which are pivotally mounted at their base by means of trunnions 299 and mounted on these rods are the rings 210 which impart the resilience to the suspension. The rings 210 are very slightly compressed by pressure-applying washers 220. Then and before finally securing with nuts and lock-nuts 230, there bear against the two washers 220 at the same time and in the direction of the length of the side-members 110, the yokes 240 having bosses 250 and trunnions 299 in which the rods 690 extend.

Disposed on the inner walls of the side-members 100 are the support members 270 which allow therebetween sufficient space for the movements of the link 120 and carry in their lower part the cups 280.

In imagining the end of the rearward movement produced by the action of the jack 110 on the link 120, it will be observed that there is produced an upward movement of the wheel 42, that the boss 250 of the yoke 240 is engaged in the cup 280 producing at this moment the actuation of the suspension constituted by the rings 210. As the rods 690 are slidable in the rings 210, the washers 220 and the trunnions 260 of the yokes 240, the elasticity of the rings 210 may be freely stressed. As the upper parts of the rods 690 emerge from the yoke 240, they pass on each side of the support members 270 while retaining a certain possibility of longitudinal pivoting owing to the trunnions 299 and 260. At rest, the slight pre-established compression of the rings upon assembly returns the whole assembly to a perfect vertical position.

If the link 120 had moved forwardly, as all of the aforementioned elements of the suspension do not engage the support member 270, the whole of the mechanism would move further upwardly and inside the side-members 100 and bring the axles 182 in contact with the side-members 100 (FIG. 17 in respect of a transverse axle, FIG. 18 for a semi-axle) so that the wheels are retracted for a railway transport (FIG. 2), a cross-country transport (FIG. 4) and a transport by sea (FIG. 5).

At this moment, and when the whole of the road set of wheels, the wheels and mechanisms are raised, it is possible to lock the assembly in the upper position by means of the rods of small hydraulic jacks so as to prevent any accidental lowering of any element during the transport modes shown in FIGS. 4 and 5 and mainly in the railway transport shown in FIG. 2.

The arm 140 synchronizes the movement of the axles 182 and imparts to this connection a certain elasticity so as to increase flexibility of the suspension when there are a plurality of successive axles, and particularly for the passage over changes in level or small obstacles and, in normal travelling, it also acts as an anti-bunting element.

These results are obtained by means of a double-acting movement-compensating element.

The arm 140 (FIG. 19) consists of a rod 300 fixed to the housings 160, a bearing disk 310 being rendered rigid with this rod. On each side of this disk 310 are juxtaposed rings 320 of elastomer and the assembly comprising the rings 320, the disk 310, the rings 320 is trapped in a cylindrical casing 330 rigid with a partly hollow rod 340 fixed to the housing 160 of the following road axle. The rod 300 freely slides in the casing 330 inside the hollow part of the rod 340.

Upon the passage over a change in surface level or over a small obstacle, the jerk is undergone in succession and not simultaneously by the wheels of the road set of wheels 18, the suspensions reacting also in succession so that there are created differences in the movements and therefore variations between the distances between the axes which are absorbed and restored by the movement-compensating element described hereinbefore.

The platform 37 thus fully equipped may adapt itself to different modes of transport (FIGS. 2, 3, 4 and 5).

For road travel (FIG. 3), the adaptation is exactly identical to that of a conventional semi-trailer.

For the adaptation to railway travel, there are employed two bogies provided with specially designed and equipped, but absolutely identical, platforms. In this way, special precautions need not be taken for the presentation of the road convoy on the area of a sunk track necessary for the rail-road transfer procedure.

The platforms of the bogies 39 have a bed-plate structure 900 which is low enough to permit the alignment, in the vertical plane, of the axis of the buffers 380 with the axis of resistance of the platform 37 when the latter is in position on the bogies 39 (FIG. 10).

While this alignment in the vertical plane is effected by merely the effect of gravity, the alignment in the longitudinal direction, which is essential to permit the positioning of all the devices for hooking, connecting and safety, is liable to be especially difficult since it depends on the driving skill of the road driver and, moreover, the total weight of the carrying platform with the load is liable to be very high.

Owing to the device according to the invention, employing shoes 154 having free rollers 155, this alignment is easily carried out.

Provided on the bed-plates 900 on the side opposed to the buffers 380 is an opening allowing the free longitudinal passage of the king-pin 4 for road traction up to a position in vertical alignment with the axis of the bogie 39 and sufficiently large to permit a bad alignment of the platform 37 with the bogies 39 of about 15 cm on each side so that this king-pin 4 will not be damaged.

On each side of this opening and in vertical alignment with the transverse axis of the bogies 39, are provided apertures with lateral guides 360 (FIGS. 22 and 23) in which the shoes 154 provided with rollers 155 can rise and descend. The vertical displacement is achieved by means of the levers 370 forming two toggles of the mechanism 153 the movements of which are synchronized by a small link 99 on which acts the end of an arm of another toggle constituted by the links 390 and 40.

The link 40 is shifted by a sector 410 which permits, owing to the provision of a slot for this purpose, a certain freedom controlled by the link 40. The sector 410 is controlled in its partial rotation by a square-section shaft 420 which rotates under the action of arms having slidable nuts 430 the angular movements of which are produced by the rotation of a lead-screw having a differential effect, 440, driven in either direction by the control wheel 450.

As the device for aligning is put into position of use before coming into action, the positioning operation requires no effort.

However, owing to its design which associates the great resistance of the toggle articulations with their possibility of locking and shoes having free rollers, it is possible to align perfectly with the bogies convoys of a total weight ranging up to 80 metric tons. Indeed, each shoe 154 having rollers 155 has a unit capacity of 20 tons and there are two shoes per bogie provided.

In order to carry out the aligning operation with a maximum of precision and a minimum of effort, the invention provides additional special accessories which are simple and light and may be attached to the platforms of the bogies during the transport: positioning rollers 167 (FIG. 23) completed by their pins 470 and the lever 156 which also serves to perfect the positioning of the coupling traction devices with a minimum of efforts owing to the devices 151 having rollers 152.

The lever 156 is long enough to reduce the effort to be exerted but is very easy to handle. Its body is constituted by a tube 490 of such diameter as to be easily held in hands. Two branches of the tube are interconnected by plates 50 which are sufficiently spaced apart to permit the action of a plurality of persons. The head, which is arranged in the form of a yoke, is constituted by two plates 510 having two apertures 520 and 530 either of which can be mounted on a pivot pin 480 carried by a lateral edge member 720 of the support or bogie 39 (FIGS. 24 and 25) so that it is possible to choose between two actuating forces.

By means of this lever 156 and the positioning abutment rollers 167, the three elements of the railway assembly, front bogie 39—platform 37—rear bogie 39, are aligned in the following manner.

When the platform bears against the rollers 155 of the centering shoes 154, it is not perfectly aligned in most cases: it is consequently offset to one side. On the side where it is offset to the greatest extent, one or two positioning rollers 167 are placed on the pivot pins 480 carried by the lateral member 720 of the respective bogie 39.

On the oppposite side, one or two levers 156 are placed in position on the pivot pins 480 by means of their aperture 520. It is then sufficient to pull on or push the lever which, in exerting a pressure on the edge member 700, shifts the platform until the other edge member 700 comes into contact with the positioning abutment roller or rollers 167 mounted on the opposite side. The radius of the rollers 167 is so determined as to ensure the perfect alignment of the axis of the bogie 39 with the axis of the platform 37 when one edge member 700 comes into contact with the roller 167. When the lever 156 is in position on the pivot pin 480, it is then located at the level of the chest of a man which consequently permits a good effectiveness of the effort.

When the perfect alignment has been achieved, a limited action on the control wheel 450 produces, by a chain action of the elements 440, 430, 420, 410, 40, 390, and 370, the withdrawal of the shoes 154 into their recesses 360. Even if this withdrawal occurs somewhat suddenly under the pressure of the load, this cannot produce any damage since the lowering is very limited.

The end portion 200 of the side-members 100 can then be supported on the bed-plate 900 through the medium of the four devices 151 having free rollers 152 which will, in combination with the hooking devices according to the invention, impart to the assembly of the bogie and platform, the ability to absorb a large part of the impacts without repercussion on the load. This property considerably increases the possibilities of the railway transport by allowing in particular the inclusion in the various traffics and shunting by abutment, a large number of fragile loads, which was impossible up to the present time.

Before explaining the devices and their operation, the carrying platform 37 will be brought to its final position for the placing in position of the traction and safety coupling devices required for railway transport.

Without removing the positioning rollers 167 which are on the pivot pins 480 the lever 156, whose link has been withdrawn from its cavity, is placed by its aperture 530 on a pivot pin 480 of the side opposed to the positioning rollers and the nose portion of the link 158 is engaged in one of the openings 164 provided in the middle of the edge members 700. A force suitably directed on the body of the lever will, owing to the articulation 530 and 550, shift the platform 37 toward the front of the bogies (the buffer end). This operation stops at the precise moment when the front cross-member 800 comes into contact with the piston of the shock-absorber 580.

Figure 27:
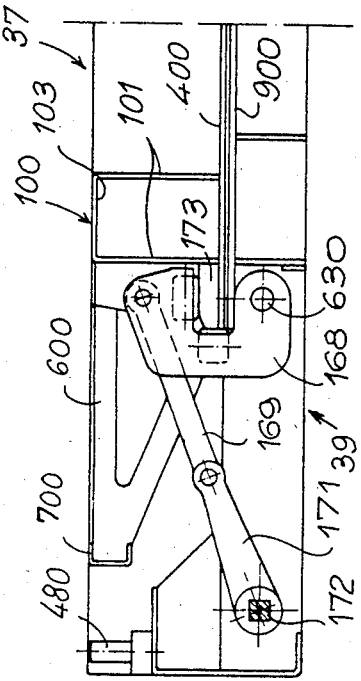
FIGS. 26 and 27 are elevational views of a mechanism for locking the carrying platform to its support by means of pivotal hooks, before locking in FIG. 26 and after locking in FIG. 27.
Figure 26:
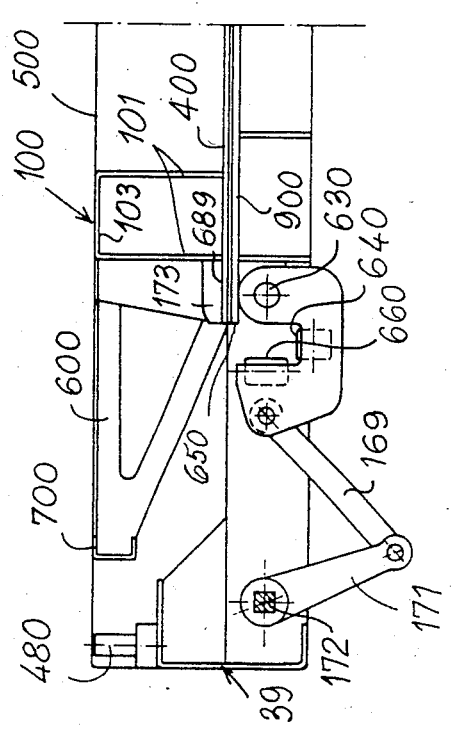

There will now be described in more detail the pivotable hooks shown in FIGS. 26 and 27 and the manner in which they are placed in position and operate.

In order to connect mechanically the two bogies 39 and the platform 37 with the strength and safety required when travelling on railways, a coupling has been designed, in the presently-described embodiment, which employs powerful hooks 168 which, by their number and their synchronized actions, provide the maximum number of guarantees. These hooks 168, which are relatively thick and made from cast or forged steel, are put into their operative position by the action of toggles constituted by links 169, 171 which cause them to pivot on their pivot pin 630. These movements are controlled by the square-sectioned shaft 172. When the hooks 168 have assumed their vertical position (FIG. 27), they are locked by the toggles 169, 171 which are then in their rectilinear force-exerting position. The thick body of the hooks has two large rollers 640 and 660: the roller 640, which has become vertical, will now avoid any lateral offsetting by the guiding it provides for the longitudinal edge 650 of the lower plate structure 400 of the platform, and the roller 660, which has become horizontal, will bear against the runway 173 mounted on the lateral edge portions 689 of the plate structure 400 so as to connect together, in the vertical direction, the various platforms and bogies while allowing a longitudinal movement in translation which is rendered smooth by the four rolling devices 151 having free rollers 152 whose unit strength is 20 metric tons.

In assuming the vertical position, the thick body of the hooks 168 is placed behind the very strong brackets 600 (FIGS. 26 and 27) rigidly secured to the outer sides of the side-members 100, which permits ensuring all the traction forces required when travelling on railways. But in order to ensure that the pivot pins 630 do not suffer from these forces, the outer shape of the body of the hooks is so designed that they bear essentially against the solid walls of lateral guides 690 (FIG. 20). It will then be possible to give a certain play to the articulation 630.

If FIGS. 20, 21, 26 and 27 are examined carefully, there will be observed the very great strength and reliability of the connection between the carrying platform 37 and the platform of the bogie 39. To produce a disconnection between these platforms, the breaking of six massive hooks 168 of steel or the simultaneous unlocking of the six strong toggles 153 would have to occur, which is practically impossible.

There will now be examined how the presently-described embodiment chosen by way of example behaves so as to absorb impacts liable to be produced by circulation on railways, whether this concerns normally encountered traffic or shunting by abutment.

At the moment of the impact, there is a first absorption of the effects by the high-performance specially-chosen buffers 380, and then, if this last-mentioned absorption is insufficient, the platform 37 slides along its carrying devices 151 and under the rollers 660 of the hooks 168 which have for this purpose a sufficient movement between the traction brackets 600 and the frame brackets 600. During this translation, the front of the platform 37 compresses, through its leading cross-member 800, two shock-absorbers 580 at the rear of the buffers 380 and coaxial with the latter. In this way, the impact forces, apart from those of very great violence, are completely absorbed by this combination of shock-absorbing elements without harm to the load after which the shock-absorbers 580 and the buffers 380 resume their initial configuration and the hooks 168 resume their lateral bearing position against the traction brackets 600.

As concerns the safety devices, it has already been mentioned that the brake pipes are connected by means of rapid couplings to connections between the ends of the carrying platform and the platform of the bogies 39. However, and as an additional safety measure, the shifting levers 430 act at the end of their locking travel on a pedal-actuated valve which causes the braking of the convoy so long as the hooks and toggles are not in their final position.

In order to permit the carrying platform 37 to effect a cross-country transport (FIG. 4), it will be adapted, at its front end, to a support in the form of a tracked tractor 8 whose bolster 70 will be equipped with a strong system of universal joints allowing pivoting in all directions and, at the rear, to a support in the form of a tracked bogie 9 having in its upper part a cradle 7 including the same coupling devices as for travelling on railways.

What is claimed is:

1. A carrying platform (37) for receiving a goods van or container and in separable combination with a support (39) which is selectively a railway bogie, a road bogie, a tracked road bogie and a support structure in a boat for transporting the van or container selectively by railway, road and sea, said platform comprising a frame having two parallel longitudinally-extending side-members (100) which have two opposed end portions (200) and an intermediate portion interconnecting said end portions, cross-members (500) interconnecting said side-members, two plate structures (400) respectively interconnecting said two opposed end portions of said two side-members, rolling devices (151) including first free-running rollers (152) having axes of rotation extending transversely of said platform, said rolling devices being connected to said two end portions of said side-members so that said first free-running rollers (152) project downwardly from an underside of said plate structures (400) for directly engaging said support and allowing free displacement of said platform longitudinally of said support, a road set of wheels (18, 41) movably mounted on said platform and movable between selectively a retracted position, a road engaging position and an extended position beyond said road engaging position, hydraulic prop structures (32) movably mounted on said platform and movable selectively between a retracted position, a road engaging position and an extended position beyond said road engaging position, and hydraulic jacks (110) mounted on said platform for selectively raising and lowering said platform and operative, in combination with said prop structures, to permit selectively raising said platform for transferring said van or container to a loading platform and removing said van or container from said loading platform and then lowering said platform, and means (156, 167, 168, 173, 580) for positioning the platform relative to the support and retaining the platform on the support.

2. A carrying platform (37) for receiving a goods van or container and in separable combination with a support (39) which is selectively a railway bogie, a road bogie, a tracked road bogie and a support structure in a boat for transporting the van or container selectively by railway, road and sea, said platform comprising a frame having two parallel longitudinally-extending side-members (100) which have two opposed end portions (200) and an intermediate portion interconnecting said two opposed end portions, cross-members (500) interconnecting said side-members, two plate structures (400) respectively interconnecting said two opposed end portions of said two side-members, rolling devices (151) including free-running rollers (152) having axes of rotation extending transversely of said platform, said rolling devices being connected to said end portions of said side-members so that said first free-running rollers (152) project downwardly from an underside of said plate structures (400) for directly engaging said support and allowing free displacement of said platform longitudinally of said support, a road set of wheels (18, 41) movably mounted on said platform, hydraulic prop structures (32) movably mounted on said platform and movable selectively between a retracted position, a road engaging position and an extended position beyond said road engaging position, and hydraulic jacks (110) mounted on said platform and connected to said road set of wheels for shifting said road set of wheels selectively between retracted, road-engaging and extending positions and operative, in combination with said prop structures, to permit selectively raising said platform for selectively transferring said van or container to a loading platform and removing said van or container from said loading platform, and then lowering said platform, and means (156, 167, 168, 173, 580) for positioning the platform relative to the support and retaining the platform on the support and comprising means (156, 480, 158, 167) for centering said platform on said support so as to dispose said platform coaxially with respect to said support.

3. A carrying platform according to claim 2, wherein said centering means comprise toggle mechanisms (153) mounted on said support and shoes (154) including second free-running rollers having axes of rotation extending longitudinally of said support and mounted on an upper side of said shoes, said shoes being upwardly movably mounted on said support so that a rolling plane of said second free rollers can be substantially raised relative to a top surface of said support so that said platform can freely roll on said second rollers, and at least one manual lever (156) for shifting said platform relative to said support when said rolling plane of said second rollers is placed in an upper position relative to said top surface of said support.

4. A carrying platform according to claim 3, wherein said support has lateral edge members (720) and said platform has lateral edge members (700) defining apertures (164) spaced-apart longitudinally of said platform, at least one pivot pin (480) is mounted on said edge members of said support, said manual lever is pivotally mountable on said pivot pin to extend laterally of said platform, and a link (158) is pivotally connected to an end portion of said lever and has an end nose portion (163) for engagement in one of said apertures in said edge member of said platform so that the platform can be displaced on said second rollers of said shoes and centered on said support by actuation of said lever.

5. A carrying platform according to claim 1, wherein lateral members (700) are mounted on said platform, said support carries lateral positioning members (167) for engaging said lateral members and positioning said platform relative to said support, and pivotal hooks (168) are mounted on said supports for engaging respective means (173) on said side-members for retaining said platform on said support, and articulated links (169, 171) are connected to said hooks for engaging and maintaining said hooks on said respective means on said side-members.

6. A carrying platform according to claim 1, wherein each end portion (200) of each side-member (100) is a substantially U-shaped cross-section defined by two laterally spaced-apart branches (101) and a transverse web (103) interconnecting said branches and each of said plate structures (400) has a lower surface contained in a horizontal plane, each of said rolling devices (151) having said first free-running rollers (152) is provided inside said U-section of said end portion (200) of the respective side-member (100) and comprises a linear rolling bearing device including said first free-running rollers and a fixing plate (178) which is connected to said two laterally spaced-apart branches (101) of the respective side-member, supporting spacer blocks (282) being interposed between said plate of said linear rolling bearing device and said transverse web (103) of the respective side-member and fixed to the respective side-member and to said plate.

7. A carrying platform according to claim 1, wherein said road set of wheels (18, 41) mounted on said platform (37) comprises at least one axle (182) and a suspension (210) for said axle, said suspension having in an upper part a yoke (240) having a boss (250), a support member (270) being fixed to the respective side-member (100) and defining a cup (280) in which cup said boss is capable of engaging when said road set of wheels is in said retracted position, a hydraulic jack (110) having a movable rod (110a), and a link (120) which is pivotally connected adjacent to one end of said link (120) to the respective side-member (100) and adjacent to an opposite end of said link (120) to said axle (182), said movable rod (110a) being pivotally connected to said link so as to be capable of shifting said link.

8. A carrying platform according to claim 7, wherein said hydraulic jack is disposed within said laterally spaced-apart branches of the respective side-member.

9. A carrying platform according to claim 7, wherein said suspension of said axle comprises a housing mounted on said axle, a lower yoke connected to said housing, a stack of rings of elastically yieldable material interposed between said upper yoke and said lower yoke, said link for shifting said road set of wheels being pivotally connected to said lower yoke.

10. A carrying platform (37) for receiving a goods van or container and in separable combination with a support (39) which is selectively a railway bogie, a road bogie, a tracked road bogie and a support structure in a boat for transporting the van or container selectively by railway, road and sea, said platform comprising a frame having two parallel longitudinally-extending side-members (100) which have two opposed end portions (200) and an intermediate portion interconnecting said end portions, cross-members (500) interconnecting said side-members, two plate structures (400) respectively interconnecting said two opposed end portions of said two side-members, rolling devices (151) including first free-running rollers (152) having axes of rotation extending transversely of said platform, said rolling devices being connected to said two end portions of said side-members so that said first free-running rollers (152) project downwardly from an underside of said plate structures (400) for directly engaging said support and allowing free displacement of said platform longitudinally of said support, a road set of wheels (18, 41) movably mounted on said platform and movable between selectively a retracted position, a road engaging position and an extended position beyond said road engaging position, hydraulic prop structures (32) movably mounted on said platform and movable selectively between a retracted position, a road engaging position and an extended position beyond said road engaging position, and hydraulic jacks (110) mounted on said platform for selectively raising and lowering said platform and operative, in combination with said prop structures, to permit selectively raising said platform for transferring said van or container to a loading platform and removing said van or container from said loading platform and then lowering said platform, and means (156,167,168,173,580) for positioning the platform relative to the support and retaining the platform on the support, each side-member having substantially an inverted U-shaped cross-section defined by two laterally spaced apart branches (101) and a transverse web (103) interconnecting said branches, each side members comprising lateral wings (102) laterally extending from the lower ends of said branches thereby imparting to said side-member a substantially omega-shaped cross-section.

* * * * *